(12) United States Patent
Taylor et al.

(10) Patent No.: US 6,929,188 B2
(45) Date of Patent: Aug. 16, 2005

(54) VARIABLE FLOW FLUID TEMPERING VALVE

(75) Inventors: Gareth Peter Taylor, Indian Trail, NC (US); Jason Daniel Scharf, Charlotte, NC (US)

(73) Assignee: Conbraco Industries, Inc., Matthews, NC (US)

( * ) Notice: Subject to any disclaimer, the term of this patent is extended or adjusted under 35 U.S.C. 154(b) by 15 days.

(21) Appl. No.: 10/753,551

(22) Filed: Jan. 8, 2004

(65) Prior Publication Data

US 2005/0150965 A1   Jul. 14, 2005

(51) Int. Cl.[7] ......................... G05D 23/13; G05D 23/12
(52) U.S. Cl. .............................. 236/12.12; 236/12.13; 236/12.15
(58) Field of Search ........................... 236/12.1, 12.11, 236/12.12, 12.13, 12.15; 137/625.4

(56) References Cited

U.S. PATENT DOCUMENTS

| | | | |
|---|---|---|---|
| 5,011,074 A | 4/1991 | Kline | |
| 5,024,378 A | 6/1991 | Bergmann | |
| 5,203,496 A | 4/1993 | Kline | |
| 5,323,960 A | 6/1994 | Kline | |
| 5,350,112 A | 9/1994 | Stein | |
| 5,379,936 A | 1/1995 | Kline | |
| 5,647,531 A | 7/1997 | Kline | |
| 5,671,904 A | 9/1997 | Minutillo | |
| 6,119,947 A | 9/2000 | Couture | |
| 6,517,006 B1 * | 2/2003 | Knapp | 236/12.2 |
| 6,575,377 B1 | 6/2003 | Graves | |
| 6,604,687 B2 | 8/2003 | Goncze | |
| 6,637,668 B2 * | 10/2003 | Eveleigh | 236/12.16 |
| 6,820,816 B1 * | 11/2004 | Reid | 236/12.13 |

OTHER PUBLICATIONS

Crane Powers, Hydro Guard Single Valve Hi-Lo, Brochure, Oct. 2000, 6 pgs, USA.
Powers, Product Specification Hi/Lo Cabinet Supply Fixture, Nov. 2003, 2 pgs, USA.

* cited by examiner

*Primary Examiner*—Marc Norman
(74) *Attorney, Agent, or Firm*—Adams Evans P.A.

(57) ABSTRACT

A tempering valve is connected to hot and cold water supplies. The tempering valve has first and second thermal valves, each of which mixes hot and cold water flows to produce a tempered flow at a selected temperature. the mixed flow from the first thermal valve bypasses through the second thermal valve. A small valve assembly is responsive to the flow rate therethrough. At low flow rates, direct hot and cold water flow paths to the second thermal valve are blocked. At or above a selected transition flow rate, the small valve assembly opens to permit direct hot and cold water flows from hot and cold water inlets to the second thermal valve. The tempering valve may include a failure protection valve which shuts off all flow in case of a cold water supply failure.

16 Claims, 5 Drawing Sheets

VARIABLE FLOW FLUID TEMPERING VALVE

BACKGROUND OF THE INVENTION

This invention relates generally to a fluid tempering valve and more particularly to a tempering valve which accurately controls the temperature of a fluid at both high and low flow rates.

Tempered fluid mixing systems are used in a variety of commercial and industrial applications, for example, in gang showers. A typical system includes a thermostatic mixing valve or tempering valve which automatically blends hot and cold water supply streams to produce a mixed water output stream having a selected temperature. This tempered water is supplied through a common manifold to a plurality of fixtures such as shower heads.

Such tempered water mixing systems must be able to maintain the desired temperature regardless of the flow rate demanded. For example, a system could have a single fixture in use, or more than 20 fixtures could be in use simultaneously. It is difficult to design a tempering valve which accurately maintains a set temperature at widely varying flow rates. Attempts have been made in the prior art to provide accurate mixing at all flow rates. For example, some systems use a pair of mixing valves, one sized for a low flow rate and the other sized for a high flow rate, connected together with a pressure regulating valve or check valve between the outlets of the two mixing valves. However, when the larger valve does open, it is still only flowing a small percentage of the total flow. Such a system tends to have a "dead zone" of intermediate flow rates where the tempering is inaccurate. Accordingly, there is a need for a fluid tempering valve which accurately controls temperature at both high and low flow rates.

BRIEF SUMMARY OF THE INVENTION

Therefore, it is an object of the invention to provide a tempering valve which provides accurate temperature control at varying flow rates.

It is another object of the invention to provide a tempering valve in which all of the mixed water flow passes through the main valve regardless of flow rate.

It is another object of the invention to provide a tempering valve which is responsive to a loss of cold fluid supply pressure to shut off all fluid flow.

It is another object of the invention to provide a tempering valve which is easily adjusted to a desired temperature.

These and other objects of the present invention are achieved in the preferred embodiments disclosed below by providing a fluid tempering valve, having a housing defining a first fluid inlet for receiving fluid at a first temperature, the first fluid inlet being in fluid communication with a spaced-apart first fluid port, and a second fluid inlet for receiving fluid at a second temperature higher than the first temperature, the second fluid inlet being in fluid communication with a spaced-apart second fluid port. First valve means receiving fluid from the first and second fluid inlets and mix the fluid to maintain a preselected temperature. Second valve means receiving fluid from the first and second fluid ports and mix the fluid to maintain a preselected temperature. Bypass means direct the mixed fluid from the first valve means to the second valve means.

Third valve means are responsive to the flow rate through the first valve means. The third valve means block flow communication between the first fluid inlet and the first fluid port, and between the second fluid inlet and the second fluid port, when the flow rate is less than a preselected value, and the third valve means permit fluid communication from the first fluid inlet to the first fluid port, and from the second fluid inlet to the second fluid port, when the flow rate is equal to or greater than the preselected value.

In another embodiment of the present invention, the first valve means are adapted to a preselected first flow rate; and the second valve means are adapted to a preselected second flow rate greater than the first flow rate.

In another embodiment of the present invention, the tempering valve includes means for blocking all flow through the tempering valve in response to an absence of fluid pressure in the first fluid inlet.

In another embodiment of the present invention, a tempering valve has a housing defining: first and second spaced-apart bores; a cold fluid inlet for receiving a fluid at a first temperature, the cold fluid inlet having a cold fluid check valve disposed therein which allows flow from the cold fluid inlet to the first bore but prevents flow in the opposite direction; a hot fluid inlet for receiving a fluid at a second temperature greater than the first temperature, the hot fluid inlet having a hot fluid check valve disposed therein which allows flow from the hot fluid inlet to the first bore but prevents flow in the opposite direction; a hot fluid port spaced-apart from the hot fluid inlet and connected in flow communication with the first and second bores; a cold fluid port spaced-apart from the cold fluid inlet and connected in flow communication with the first and second bores; an outlet port; and a bypass passage connecting the first and second bores.

A small valve assembly disposed in the first bore includes an outer sleeve having upper and lower ends and being movable between a closed position wherein fluid flow is blocked from the first fluid inlet to the first fluid port, and from the second fluid inlet to the second fluid port, and an open position wherein fluid flow is permitted from the first fluid inlet to the first fluid port, and from the second fluid inlet to the second fluid port; and a first thermal valve disposed in the outer sleeve, the small thermal valve operative to control the relative proportions of fluid flows from the hot and cold water inlets to the bypass passage for maintaining a preselected fluid temperature.

A large valve assembly is disposed in the first bore, including a second thermal valve. The second thermal valve is operative to control the relative proportions of flow from the hot and cold water ports to the outlet port for maintaining a preselected fluid temperature. The small valve assembly moves to the closed position when the flow therethrough is less than a preselected rate, and the small valve assembly moves to the open position when the flow therethrough is equal to or greater than the preselected rate, and wherein the flow from the first thermal valve passes from the bypass passage to the outlet port through the second thermal valve regardless of the position of the small valve assembly.

In another embodiment of the present invention, the small valve assembly includes: a first surface having a first area in fluid communication with the cold fluid inlet; a second surface having a second area in fluid communication with the hot fluid inlet, the second area being equal to the first area; and a third surface having a third area in fluid communication with the bypass passage, the third area being equal to the sum of the first and second areas.

In another embodiment of the present invention, the tempering valve further includes biasing means for urging the small valve assembly towards the closed position.

In another embodiment of the present invention, the biasing means comprise a spring disposed between the bypass passage and the third surface.

In another embodiment of the present invention, the first thermal valve comprises a first cylinder disposed in the first bore in fluid communication with the cold fluid inlet, the hot fluid inlet, and the bypass passage, the first cylinder having first upper and lower sealing edges and a first cylinder seal which prevents fluid communication between the hot and cold water inlets; and a first temperature-responsive element connected to the first cylinder and operative to move the first cylinder so for controlling the relative proportions of flow from the hot and cold water inlets to the bypass passage for maintaining a preselected fluid temperature.

In another embodiment of the present invention, the second thermal valve comprises: a second cylinder disposed in the second bore in fluid communication with the cold fluid port, the hot fluid port, the bypass port, and the outlet port, the second cylinder having second upper and lower sealing edges and a second cylinder seal which prevents fluid communication between the hot and cold water ports; and a second temperature-responsive element connected to the second cylinder and operative to move the second cylinder for controlling the relative proportions of flow from the hot and cold water ports to the outlet port for maintaining a preselected fluid temperature.

In another embodiment of the present invention, the small valve assembly includes a movable adjusting screw disposed therein for controlling a temperature set point of the second thermal valve.

In another embodiment of the present invention, the small valve assembly includes a movable adjusting stem disposed therein for controlling a temperature set point of the first thermal valve.

In another embodiment of the present invention, the adjusting stem is in threaded engagement with the small valve assembly, and includes a first set of splines disposed at an end thereof.

In another embodiment of the present invention, the tempering valve further includes an adjusting shaft mounted in the housing, the adjusting shaft having a first end including a second set of splines complementary to the first set of splines; and a second end including means for turning the adjusting shaft. The adjusting shaft is movable between a first position in which the first set of splines engages the second set of splines, and a second position in which the first set of splines is disengaged from the second set of splines.

In another embodiment of the present invention, the tempering valve further includes a failure protection valve for blocking all flow through the tempering valve in response to an absence of fluid pressure in the cold fluid inlet.

In another embodiment of the present invention, the failure protection valve blocks flow through the bypass passage in response to an absence of fluid pressure in the cold fluid inlet.

In another embodiment of the present invention, the failure protection valve includes a body having a valve inlet, a valve outlet, and a sensing port, the sensing port being connected in fluid communication with the cold fluid inlet; a piston disposed in the body, the piston movable between a closed position wherein flow from the valve inlet to the valve outlet is blocked, and an open position wherein flow from the valve inlet to the valve outlet is permitted; and biasing means for urging the piston towards the closed position. The valve inlet is connected to the bypass passage and the valve outlet is connected to the large valve assembly.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
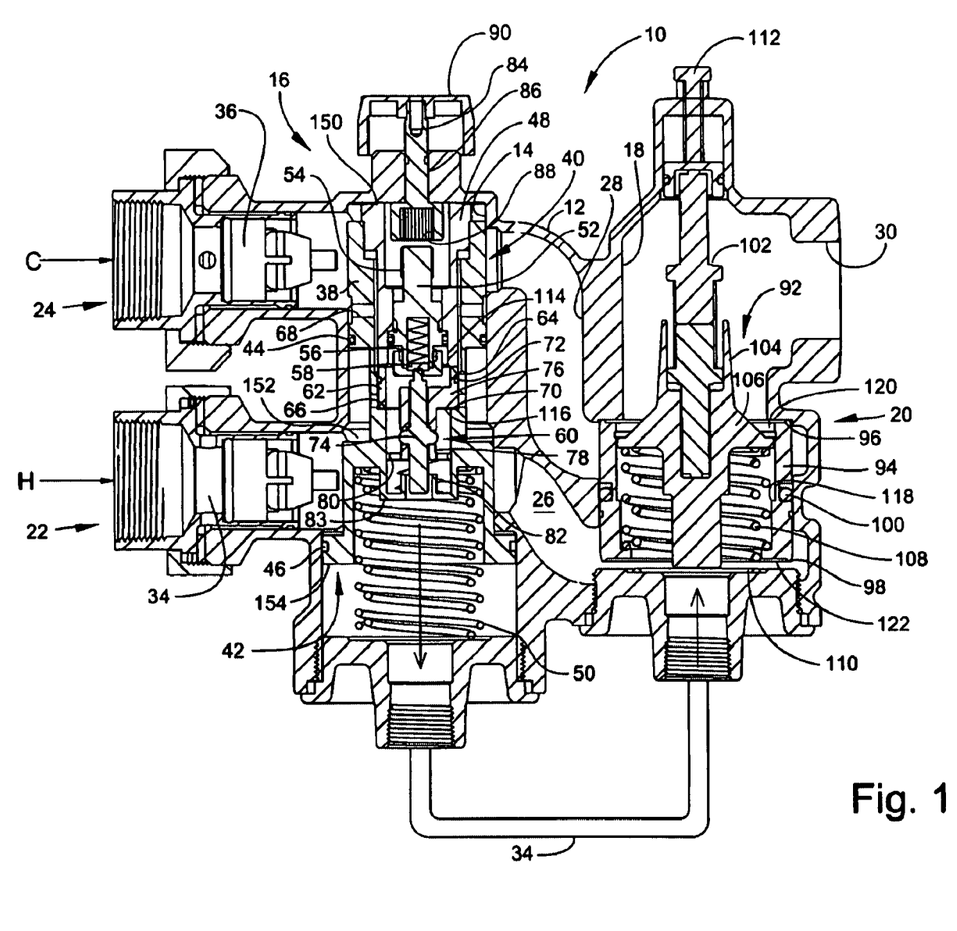
FIG. 1 is a cross-sectional view of an exemplary tempering valve including a constructed in accordance with the present invention, during a low-flow operating condition.
Figure 5:
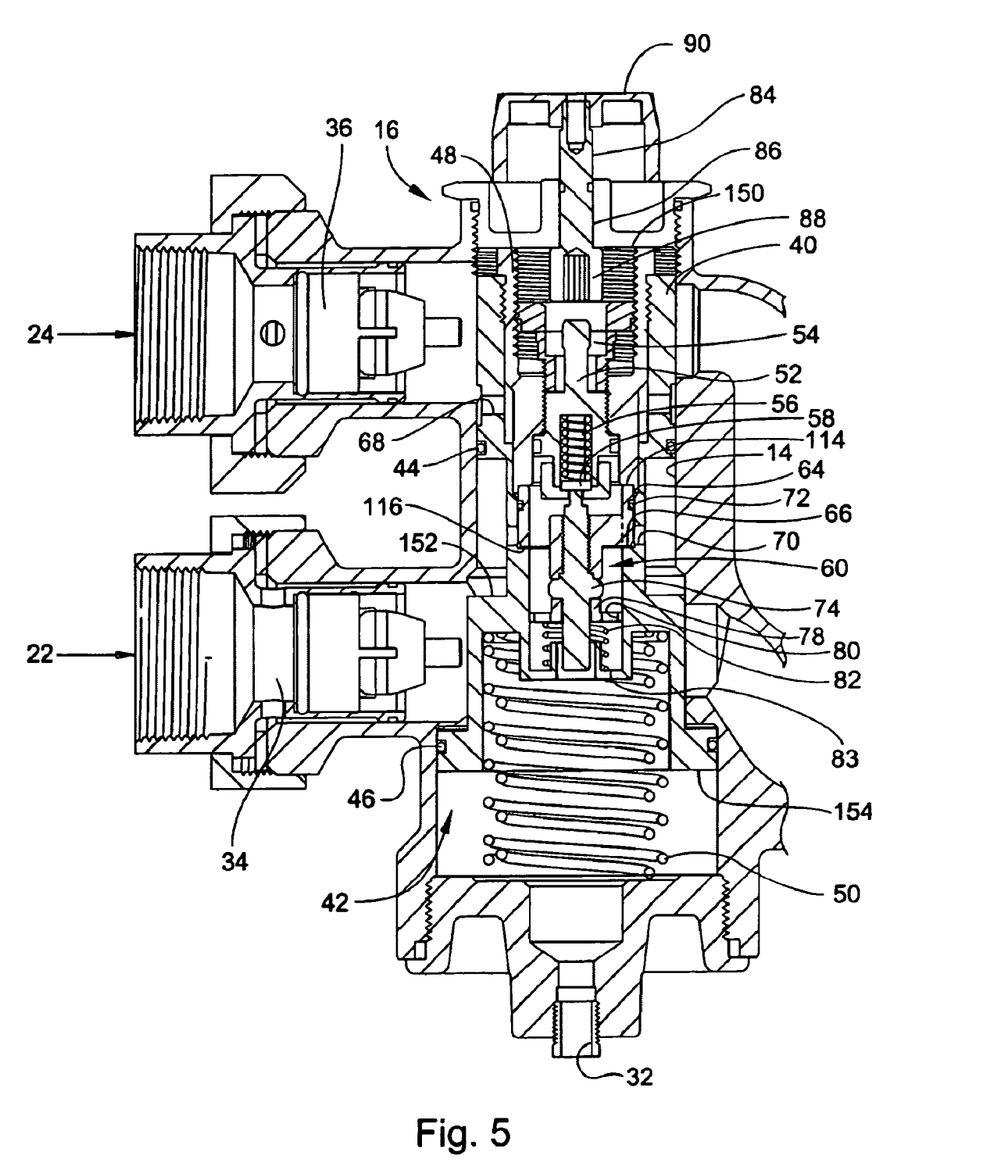
FIG. 5 is an enlarged cross-sectional view of a portion of the small valve assembly depicted in FIGS. 1–4.

Referring to the drawings wherein identical reference numerals denote the same elements throughout the various views, FIGS. 1 and 5 illustrate an exemplary tempering valve 10 constructed in accordance with the present invention. It should be noted that the present invention is equally applicable to systems which handle fluids other than water, and therefore the terms "water" and "fluid" are used interchangeably herein when describing the invention. The tempering valve 10 has a housing 12 including a first bore 14 containing a first valve assembly generally referred to as a "small valve assembly" 16, and a second bore 18 containing a second valve assembly referred to as a "large valve assembly" 20. The housing 12 also includes a hot fluid inlet 22 for receiving fluid from a hot fluid supply H, a cold fluid inlet 24 for receiving fluid from a cold fluid supply C, a hot fluid port 26 extending between the first and second bores 14 and 18, a cold fluid port 28 extending between the first and second bores 14 and 18, an outlet port 30, and a bypass passage 32 connecting the small valve assembly 16 and the large valve assembly 20.

The hot fluid inlet 22 contains a hot fluid check valve 34 which allows flow from the hot fluid inlet 22 to the first bore 14 but prevents flow in the opposite direction. The cold fluid inlet contains a cold fluid check valve 36 which allows flow from the cold fluid inlet 24 to the first bore 14 but prevents flow in the opposite direction. The small valve assembly 16 has a hollow outer sleeve 38 with upper and lower ends 40 and 42, that slides in the first bore 14 and is sealed by upper and lower seals 44 and 46. A stationary hollow inner sleeve 48 is inserted into the upper end 40 of the outer sleeve 38. A biasing spring 50 urges the small valve assembly 16 upwards towards a closed position. An elongated adjusting stem 52 is threaded into the interior of the inner sleeve 48. The adjusting stem includes a shaft with external splines 54 protruding from its upper end. The lower end of the adjusting stem 52 contains an overtravel spring 56 and a disk 58.

A small thermal valve 60 is disposed in the outer sleeve 38 below the adjusting stem 52. The small thermal valve 60 is adapted to a relatively low flow rate, meaning that its components are sized such that it can provided the desired flow of mixed fluid, for example a flow sufficient for one or a few shower fixtures, without excessive pressure loss or choking of the flow. The small thermal valve 60 includes a —hollow small cylinder 62 with circumferential upper and lower sealing edges 64 and 66. The small cylinder 62 is disposed in fluid communication with the cold fluid inlet 24 through a circumferential array of cold fluid openings 68 formed through the upper portion of the outer sleeve 38, and with the hot fluid inlet 22 through a circumferential array of hot fluid openings 70 formed through the lower portion of the outer sleeve 38. A small cylinder seal 72 disposed around the periphery of the small cylinder 62 prevents leakage between the hot and cold water flowpaths to the small cylinder 62.

A first temperature-responsive element 74 is located inside the small cylinder 62 and connected to the small cylinder 62 by a circumferential array of struts 76. For illustrative clarity only one such strut 76 is shown in FIGS. 1–4. In this example the first temperature-responsive element 74 is a known type of thermomechanical unit such as a sealed, wax-filled capsule. However, any other type of device capable of moving the small cylinder 62 in response to a temperature change may be used. An annular turbulator 78 having a plurality of holes 80 formed therethrough is mounted on the first temperature-responsive element 74. A first return spring 82 is disposed between the turbulator 78 and a seat 83 located at the bottom of the outer sleeve 38.

An adjusting shaft 84 passes through a hole 86 in the housing 12. The lower end of the adjusting shaft 84 contains female splines 88 which engage the male splines 54 of the adjusting stem 52. Means for turning this adjusting shaft 84 are provided, such as the illustrated handle 90. The adjusting shaft slides up and down in the hole 86 to engage or disengage the adjusting stem 52 as required, as explained in more detail below.

The large valve assembly 20 comprises a large thermal valve 92 disposed in the second bore 18. The large thermal valve 92 is adapted to a relatively high flow rate, meaning that its components are sized such that it can provided the desired flow of mixed fluid, for example a flow suitable for many shower fixtures, without excessive pressure loss or choking of the flow. The large thermal valve 92 includes a -hollow large cylinder 94 with circumferential upper and lower sealing edges 96 and 98. The large cylinder 94 is disposed in fluid communication with the cold fluid port 28, the hot fluid port 26, the bypass passage 32, and the outlet port 30. A large cylinder seal 100 disposed around the periphery of the large cylinder 94 prevents leakage between the hot and cold water ports 26 and 28.

A second temperature-responsive element 102 is located above the large cylinder 94 and connected to the large cylinder 94 by an annular adapter 104 having a plurality of radially-extending struts 106. In this example the second temperature-responsive element 102 is a known type of thermomechanical unit such as a sealed, wax-filled capsule. However, any other type of device capable of moving the large cylinder 94 in response to a temperature change may be used. A second return spring 108 is disposed between the adapter 104 and a seat 110 located at the bottom of the second bore 18. A threaded adjusting screw 112 is mounted in the housing 12 above the upper end of the second temperature-responsive element 102.

The small thermal valve 60 operates as follows: Water flows into the small thermal valve 60 through both the hot and cold fluid openings 70 and 68, from the hot and cold fluid inlets 22 and 24. It flows past the upper and lower sealing edges 64 and 66 of the small cylinder 62, past the first temperature-responsive element 74, and through the lower end 42 of the outer sleeve 38. At temperatures below a selected metering range, the small cylinder 62 is urged upward by the first return spring 82 so that the upper sealing edge 64 contacts an upper sealing surface 114. Therefore, most of the flow of water will be from the hot fluid openings 70, past the lower sealing edge 66, and into the bypass passage 32. As the temperature increases, the first temperature-responsive element 74 expands upward until its upper end contacts the disk 58. Further expansion of the first temperature-responsive element 74 causes it to displace the small cylinder 62 downward, opening a flow path between the upper sealing edge 64 and the upper sealing surface 114, and simultaneously reducing the size of the flow path beneath the lower sealing edge 66. The mixed water flow passes through the holes 80 in the turbulator 78. This causes a turbulent flow pattern which improves the mixing of the hot and cold flows.

As the temperature further increases, the small cylinder 62 is finally moved all the way to its lowest position in which the lower sealing edge 66 contacts a lower sealing surface 116, thus cutting off all hot water flow. Under normal operation, the disk 58 does not move. However, if the small thermal valve 60 should be heated beyond its intended operating range, the excess force generated by the first temperature-responsive element 74 will displace the disk 58 and compress the overtravel spring 56. This prevents damage to the first temperature-responsive element 74.

The temperature of the mixed water can be selected by moving the adjusting stem 52 to move it up or down, which changes the distance the first temperature-responsive element 74 must move before it contacts the disk 58. The adjusting stem 52 is moved by pushing down on the handle 90 until the female splines 88 of the adjusting shaft 84 engage the male splines 54 of the adjusting stem 52. The handle 90 may then be used to rotate the threaded adjusting stem 52. Once the adjustment is complete, water pressure in the small valve assembly 16 pushes the adjusting shaft 84 back up.

At low flow rates, the force on the third surface 154 is nearly equal to the sum of the forces on the first and second surfaces 150 and 452. There is a small net downward force on the small valve assembly. This downward force is overcome by the biasing spring 50, so that the small valve assembly 16 remains in the upper or closed position. In this position, the flow paths from the cold fluid inlet 24 to the cold fluid port 28, and from the hot fluid inlet 22 to the hot fluid port 26, are cut off. All of the flow thus passes through the small thermal valve 60 where it is mixed to the correct temperature. The mixed flow then passes out through the bypass passage 32 and into the bottom of the large thermal valve 92. The mixed flow then moves up past the second temperature-responsive element 102 and the adapter 104, and out of the outlet port 30. In this flow condition, the large thermal valve 92 has no effect on the temperature of the outgoing flow, because all of the flow bypasses the operating part of the large thermal valve 92. However, because the flow is directed past the second temperature-responsive element 102, the large thermal valve 92 is "primed" by sensing the bypass flow, and the large cylinder 94 is moved to the correct mixing position for the temperature of the flow passing through it.

Figure 2:
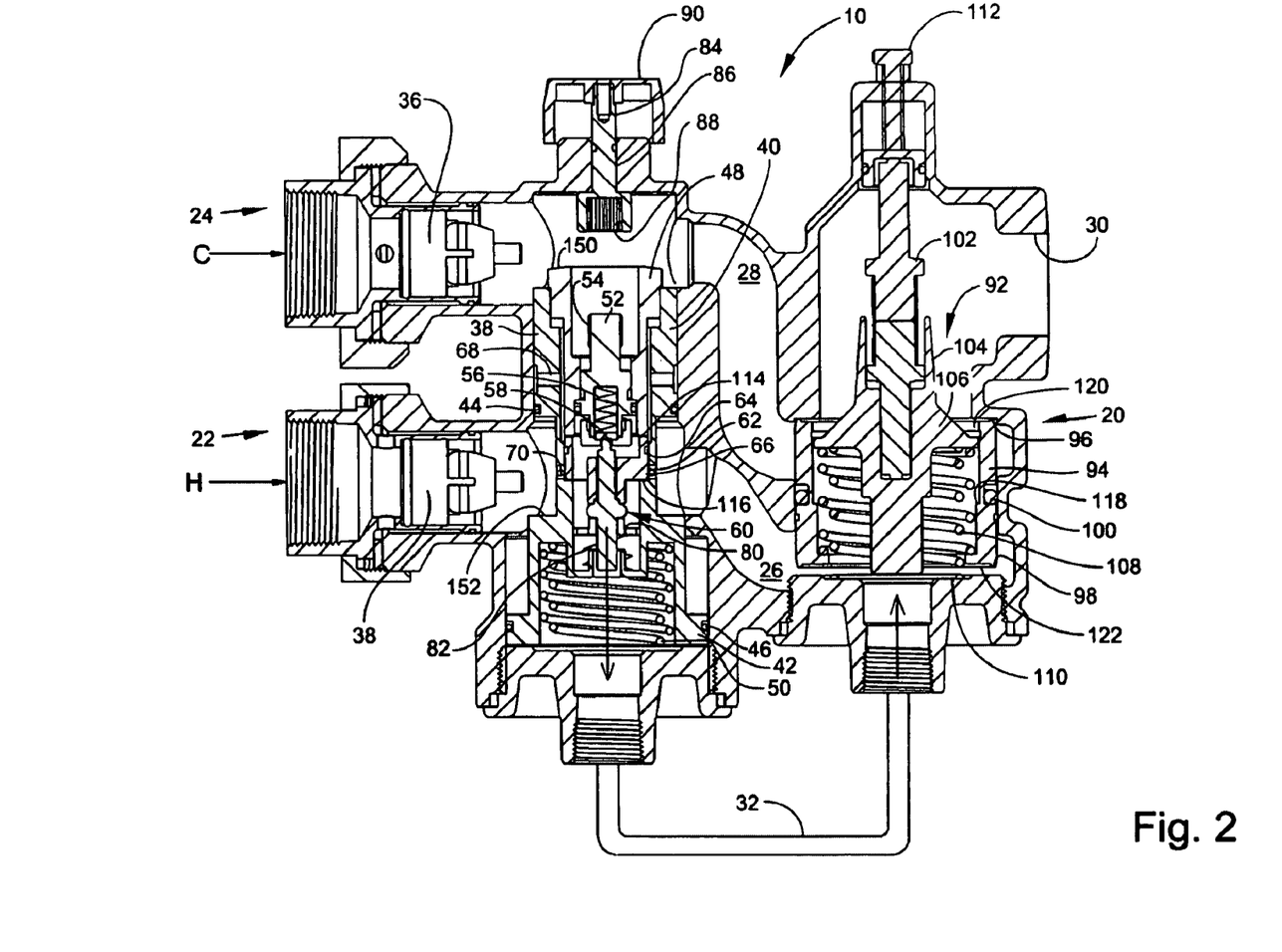
FIG. 2 is a view of the valve of FIG. 1, during a high-flow operating condition.

As the flow out of the outlet port 30 increases, the pressure drop at the lower end of the small valve assembly 16 increases. At a sufficient flow rate, the pressure on the third surface 154 drops to the point that the small valve assembly 16 can compress the biasing spring 50 and move downward to a lower or open position, as shown in FIG. 2. This simultaneously opens both hot and cold fluid flowpaths so that hot fluid can flow directly from the hot fluid inlet 22 to the hot fluid port 26, and from the cold fluid inlet 24 to the cold fluid port 28.

Once the small valve assembly 16 opens, the small thermal valve 60 continues to mix hot and cold fluid as described above, and this mixed flow goes through the bypass passage 32 to the large valve assembly. The large thermal valve 92 also begins to function as follows. Fluid flows into the large thermal valve 92 through both the hot and cold fluid ports 26 and 28. It flows past the upper and lower sealing edges 96 and 98 of the large cylinder 94, past the second temperature-responsive element 102 and the adapter 104, and out through the outlet port 30. Because of the bypass flow from the small thermal valve 60, the second temperature-responsive element 102 will have already expanded downward until the adapter 104 has contacted a ledge 118 in the large cylinder 64 and caused it to displace the large cylinder 94 downward. A flow path will be open between the upper sealing edge 69 and an upper sealing surface 120, and also between the lower sealing edge 98 and a lower sealing surface 122.

Thus, the large cylinder 94 will already be at approximately the correct position to mix the hot and cold fluids to the desired temperature. If the temperature decreases below a selected level, the second temperature-responsive element 102 will contract, allowing the second return spring 108 to force the large cylinder 94 upwards. This allows relatively more hot fluid to enter the large tempering valve 92. As the temperature increases above a selected level, the large cylinder 94 will move downward reducing the size of the flow path beneath the lower sealing edge 98. As the temperature further increases, the large cylinder 94 will finally move all the way to its lowest position in which the lower sealing edge 98 contacts the lower sealing surface 122, thus cutting off all hot water flow. The temperature of the mixed water can be selected by moving the adjusting screw 112 up or down, which changes the static position of the second temperature-responsive element 102.

Thus, the total flow through the tempering valve 10 always passes through the large valve assembly 20. Practically this means that at flow rates just above the transition value, the percentage of the flow passing through the large tempering valve 92 is much greater than in prior art designs. This prevents the large tempering valve 92 from operating at very low flows, which are far below its design operating point, at which it controls flow inefficiently.

Figure 3:
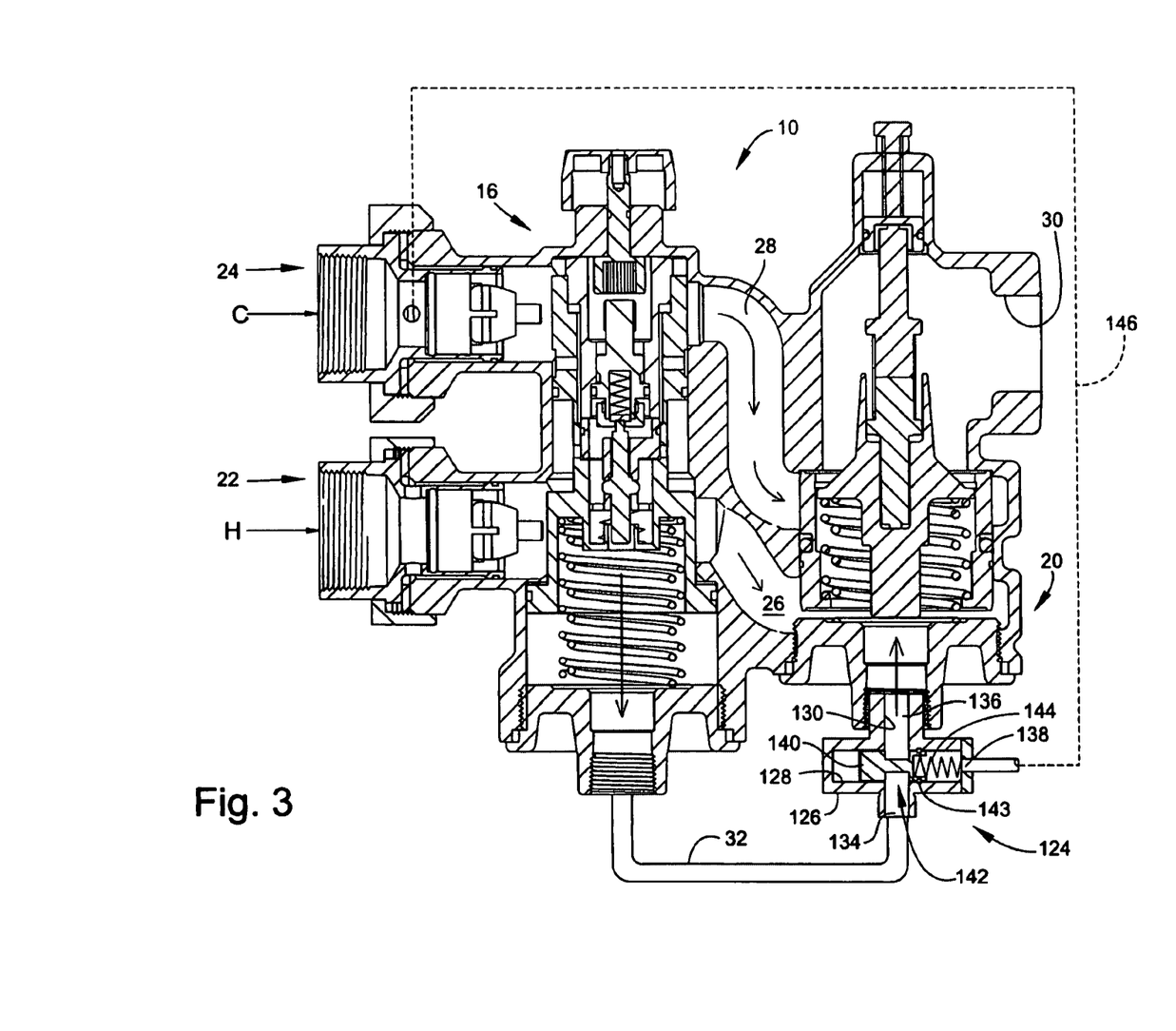
FIG. 3 is a cross-sectional view of the tempering valve of FIG. 1 having a supply failure protection valve added thereto, during normal operation; a FIG. 4 is a view of the tempering valve of FIG. 3 in a condition where the cold water supply has failed.
Figure 4:
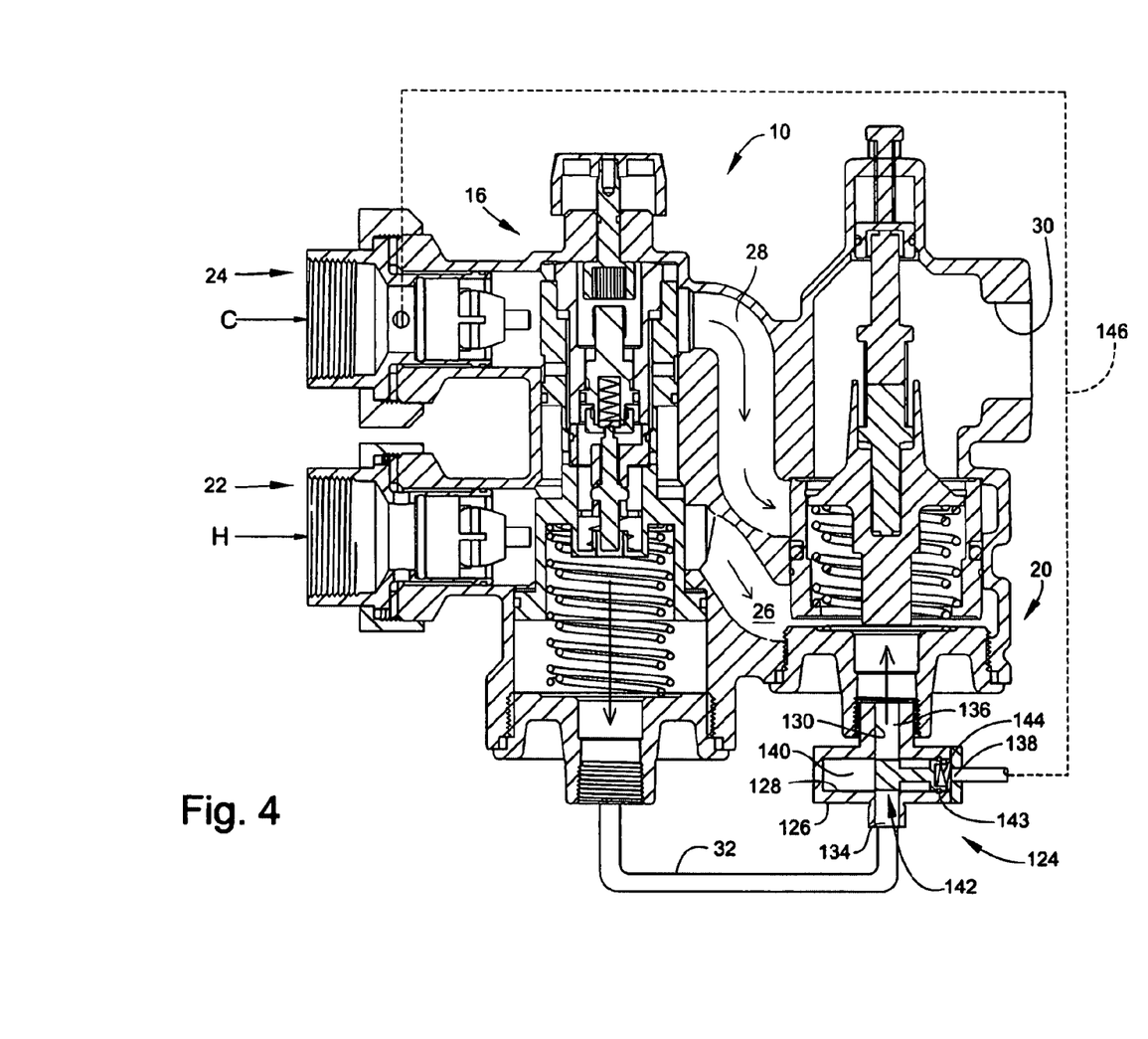

FIGS. 3 and 4 depict the addition of an optional supply failure protection valve 124 to the tempering valve 10. The failure protection valve 124 includes a body 126 having a first passage 128, a perpendicular second passage 130, a valve inlet 134, a valve outlet 136, and a sensing port 138. A piston 140 having a transverse passage 142 formed therethrough is disposed in the first passage 128 and is movable between an open position which permits flow from the valve inlet 134 through the second passage 130 to the valve outlet 136, and a closed position which blocks flow from the valve inlet 134. A closing spring 144 is installed in the first passage 128 and urges the piston 140 towards the open position. The failure protection valve 124 is connected to the tempering valve 10 so that mixed flow from the bypass passage 32 enters the valve inlet 134 and the valve outlet 136 is connected to the large valve assembly 20. A sensing line 146 (shown schematically in FIGS. 3 and 4) carries fluid from the cold fluid inlet 24 upstream of the cold fluid check valve 36 to the sensing port -138. Under normal operating conditions, as shown in FIG. 3, the fluid pressure of the cold fluid supply forces the piston 140 to the open position. The mixed flow from the small valve assembly 16 is free to pass from the valve inlet through the second passage 130 to the valve outlet 136 and then into the large valve assembly 20.

FIG. 4 shows a condition in which the cold fluid supply C has failed. In this condition the pressure in the sensing port 138 will drop to zero (or a very low level) and the closing spring 144 will compress and allow the piston 140 to a closed position. This immediately cuts off the flow of mixed-temperature fluid from the small valve assembly 16 to the large valve assembly 20. Therefore, any hot water traveling through this flowpath will be shut off. With the failure protection valve 124 closed, the pressure will build up below the small valve assembly, against the third surface 154, until it equals the supply pressure. The first biasing spring 50 will then force the small valve assembly 16 upwards to the closed position, which closes off the flowpath from the hot and cold fluid inlets 22 and 24 to the hot and cold fluid ports 26 and 28. Thus, all fluid flow out of the tempering valve 10 will be cut off, preventing any possible scalding of users.

The foregoing has described a tempering valve suitable for use at varying flow rates. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A fluid tempering valve, including:
    a housing defining a first fluid inlet for receiving fluid at a first temperature, said first fluid inlet being in fluid communication with a spaced-apart first fluid port, and a second fluid inlet for receiving fluid at a second temperature higher than said first temperature, said second fluid inlet being in fluid communication with a spaced-apart second fluid port;
    first valve means for receiving fluid from said first and second fluid inlets and mixing said fluid to maintain a preselected temperature;
    second valve means for receiving fluid from said first and second fluid ports and mixing said fluid to maintain a preselected temperature;
    bypass means for directing mixed fluid from said first valve means to said second valve means;
    third valve means responsive to the flow rate through said first valve means, said third valve means for blocking flow communication between said first fluid inlet and said first fluid port, and between said second fluid inlet and said second fluid port, when said flow rate is less than a preselected value, and said third valve means permitting fluid communication from said first fluid inlet to said first fluid port, and from said second fluid inlet to said second fluid port, when said flow rate is equal to or greater than said preselected value.

2. The tempering valve of claim 1 wherein said first valve means are adapted to a preselected first flow rate; and said second valve means are adapted to a preselected second flow rate greater than said first flow rate.

3. The tempering valve of claim 1 further including means for blocking all flow through said tempering valve in response to an absence of fluid pressure in said first fluid inlet.

4. A tempering valve, including:
    a housing defining:
        first and second spaced-apart bores;
        a cold fluid inlet for receiving a fluid at a first temperature, said cold fluid inlet having a cold fluid check valve disposed therein which allows flow from said cold fluid inlet to said first bore but prevents flow in the opposite direction;

a hot fluid inlet for receiving a fluid at a second temperature greater than said first temperature, said hot fluid inlet having a hot fluid check valve disposed therein which allows flow from said hot fluid inlet to said first bore but prevents flow in the opposite direction;

a hot fluid port spaced-apart from said hot fluid inlet and connected in flow communication with said first and second bores;

a cold fluid port spaced-apart from said cold fluid inlet and connected in flow communication with said first and second bores;

an outlet port; and a bypass passage connecting said first and second bores; a small valve assembly disposed in said first bore, including:

an outer sleeve having upper and lower ends and being movable between a closed position wherein fluid flow is blocked from said first fluid inlet to said first fluid port, and from said second fluid inlet to said second fluid port, and an open position wherein fluid flow is permitted from said first fluid inlet to said first fluid port, and from said second fluid inlet to said second fluid port;

a first thermal valve disposed in said outer sleeve, said small thermal valve operative to control the relative proportions of fluid flows from said hot and cold water inlets to said bypass passage for maintaining a preselected fluid temperature; and a large valve assembly disposed in said first bore, including a second thermal valve, said second thermal valve operative to control the relative proportions of flow from said hot and cold water ports to said outlet port for maintaining a preselected fluid temperature;

wherein said small valve assembly moves to said closed position when the flow therethrough is less than a preselected rate, and said small valve assembly moves to said open position when the flow therethrough is equal to or greater than said preselected rate, and wherein the flow from said first thermal valve passes from said bypass passage to said outlet port through said second thermal valve regardless of the position of said small valve assembly.

5. The tempering valve of claim 4 wherein said small valve assembly includes:

a first surface having a first area in fluid communication with said cold fluid inlet;

a second surface having a second area in fluid communication with said hot fluid inlet, said second area being equal to said first area; and a third surface having a third area in fluid communication with said bypass passage, said third area being equal to the sum of said first and second areas.

6. The tempering valve of claim 5 further including biasing means for urging said small valve assembly towards said -closed position.

7. The tempering valve of claim 6 wherein said biasing means comprise a spring disposed between said bypass passage and said third surface.

8. The tempering valve of claim 6 wherein said small valve assembly includes a movable adjusting stem disposed therein for controlling a temperature set point of said first thermal valve.

9. The tempering valve of claim 8 wherein said adjusting stem is in threaded engagement with said small valve assembly, and includes a first set of splines disposed at an end thereof.

10. The tempering valve of claim 9 wherein further including an adjusting shaft mounted in said housing, said adjusting shaft having a first end including a second set of splines complementary to said first set of splines; and a second end including means for turning said adjusting shaft, wherein said adjusting shaft is movable between a first position in which said first set of splines engages said second set of splines, and a second position in which said first set of splines is disengaged from said second set of splines.

11. The tempering valve of claim 4 wherein said first thermal valve comprises:

a first cylinder disposed in said first bore in fluid communication with said cold fluid inlet, said hot fluid inlet, and said bypass passage, said first cylinder having first upper and lower sealing edges and a first cylinder seal which prevents fluid communication between said hot and cold water inlets; and a first temperature-responsive element connected to said first cylinder and operative to move said first cylinder so for controlling the relative proportions of flow from said hot and cold water inlets to said bypass passage for maintaining a preselected fluid temperature.

12. The tempering valve of claim 4 wherein said second thermal valve comprises:

a second cylinder disposed in said second bore in fluid communication with said cold fluid port, said hot fluid port, said bypass port, and said outlet port, said second cylinder having second upper and lower sealing edges and a second cylinder seal which prevents fluid communication between said hot and cold water ports; and a second temperature-responsive element connected to said second cylinder and operative to move said second cylinder for controlling the relative proportions of flow from said hot and cold water ports to said outlet port for maintaining a preselected fluid temperature.

13. The tempering valve of claim 12 wherein said small valve assembly includes a movable adjusting screw disposed therein for controlling a temperature set point of said second thermal valve.

14. The tempering valve of claim 4 further including a failure protection valve for blocking all flow through said tempering valve in response to an absence of fluid pressure in said cold fluid inlet.

15. The tempering valve of claim 14 wherein said failure protection valve blocks flow through said bypass passage in response to an absence of fluid pressure in said cold fluid inlet.

16. The tempering valve of claim 15 wherein said failure protection valve comprises:

a body having a valve inlet, a valve outlet, and a sensing port, said sensing port being connected in fluid communication with said cold fluid inlet;

a piston disposed in said body, said piston movable between a closed position wherein flow from said valve inlet to said valve outlet is blocked, and an open position wherein flow from said valve inlet to said valve outlet is permitted; and biasing means for urging said piston towards said open position, wherein said valve inlet is connected to said bypass passage and said valve outlet is connected to said large valve assembly.

* * * * *